April 28, 1964     S. HILLER     3,130,666
PRESS AND CAGE ASSEMBLY
Filed Aug. 24, 1959     7 Sheets-Sheet 2
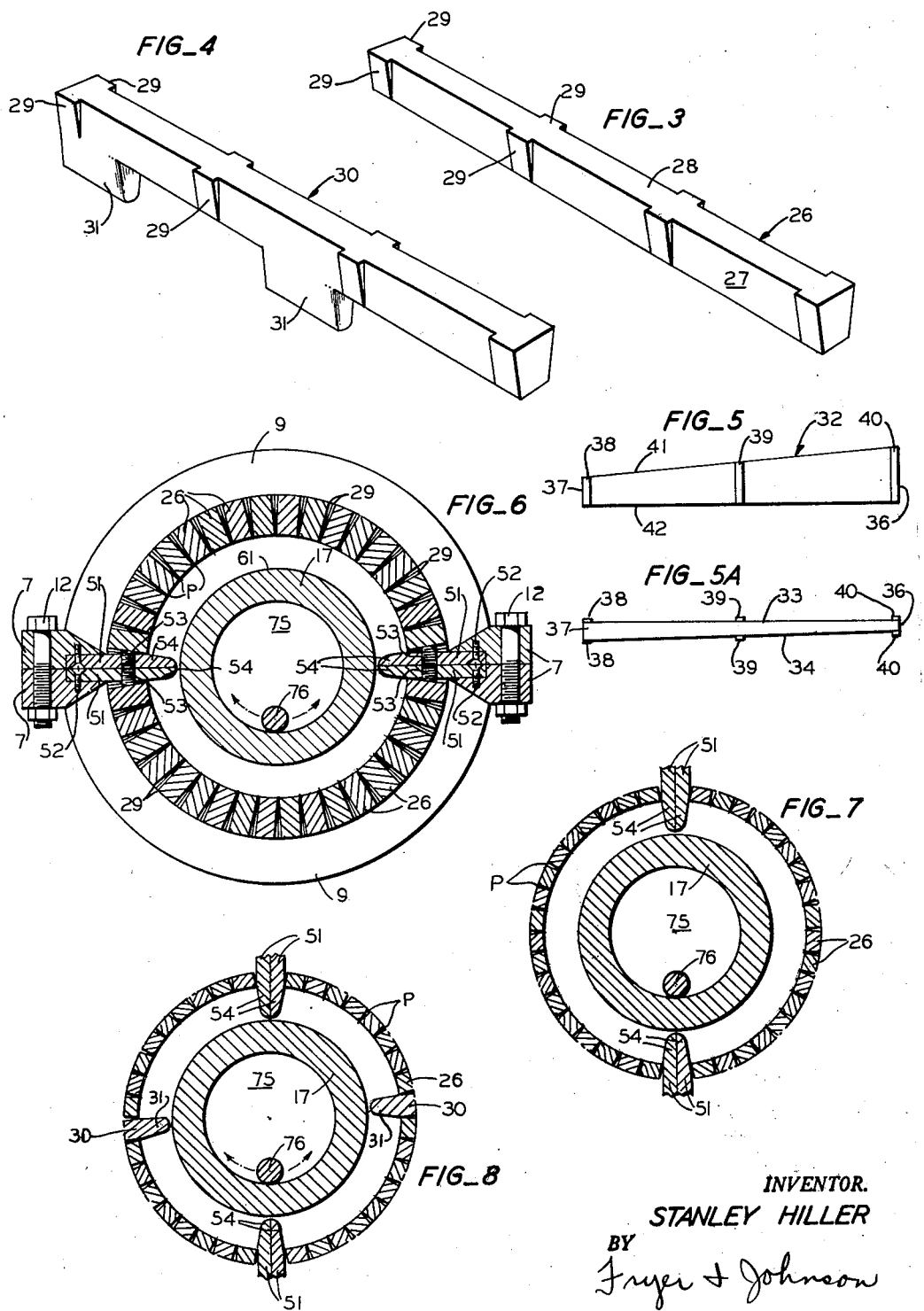
INVENTOR.
STANLEY HILLER
BY
Fryer & Johnson
ATTORNEYS FIG_9
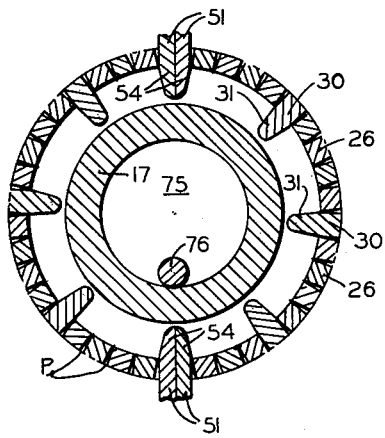
FIG_10
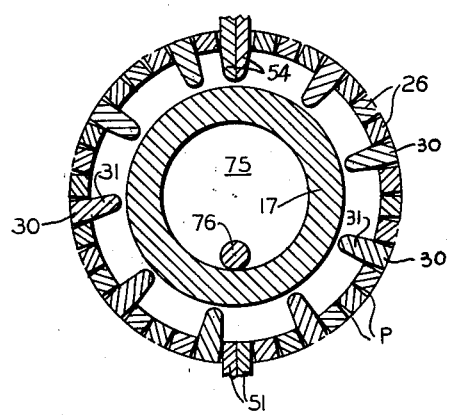
FIG_11
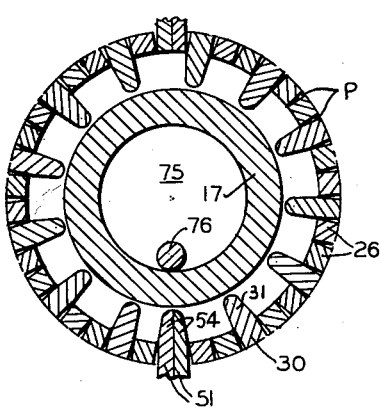
FIG_12
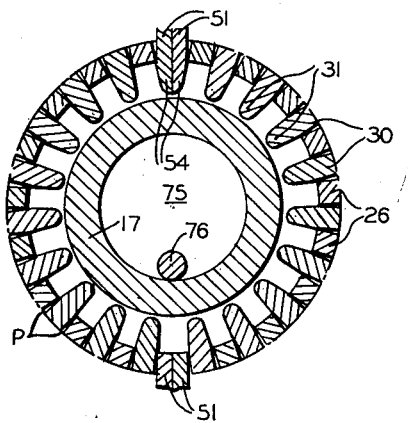
INVENTOR.
STANLEY HILLER
BY
ATTORNEYS April 28, 1964  S. HILLER  3,130,666
PRESS AND CAGE ASSEMBLY
Filed Aug. 24, 1959  7 Sheets-Sheet 4
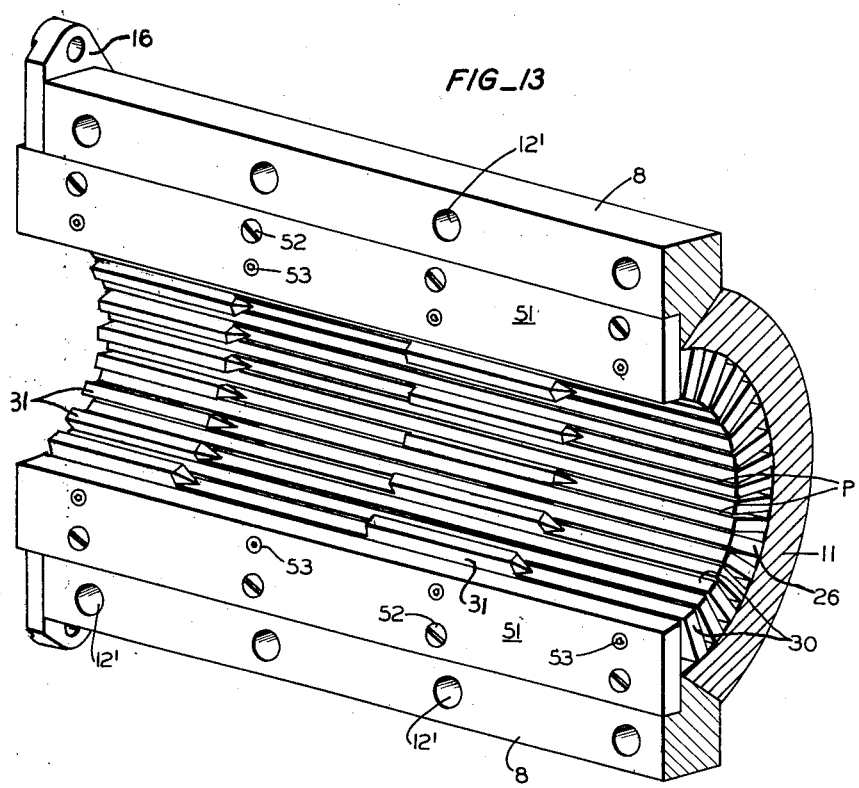
FIG_13
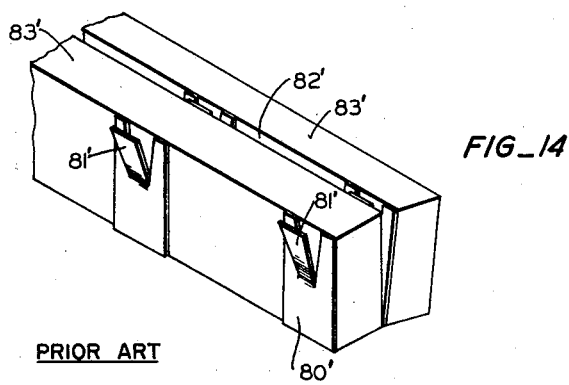
FIG_14
PRIOR ART
INVENTOR.
STANLEY HILLER
BY
Fryer & Johnson
ATTORNEYS

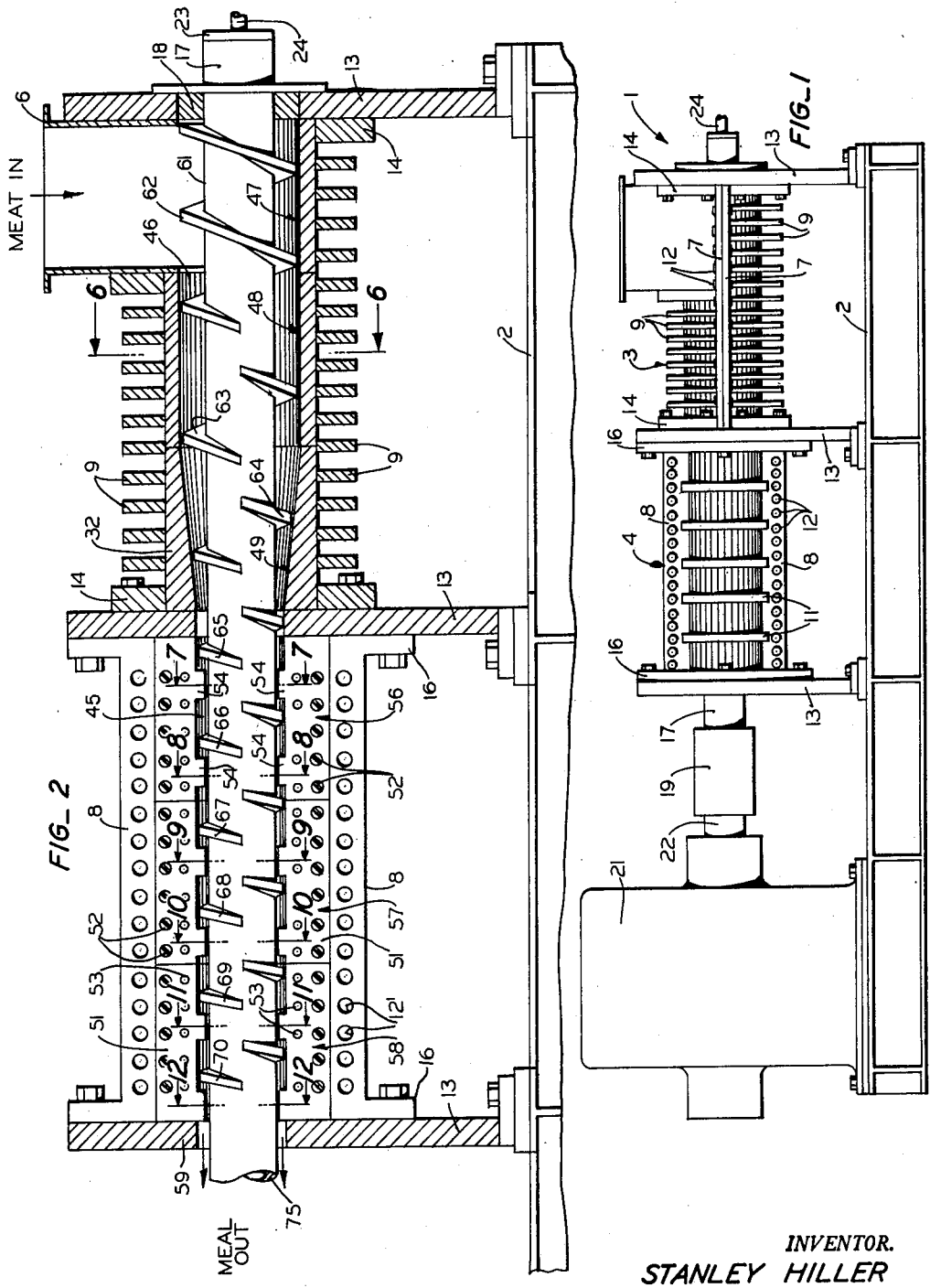

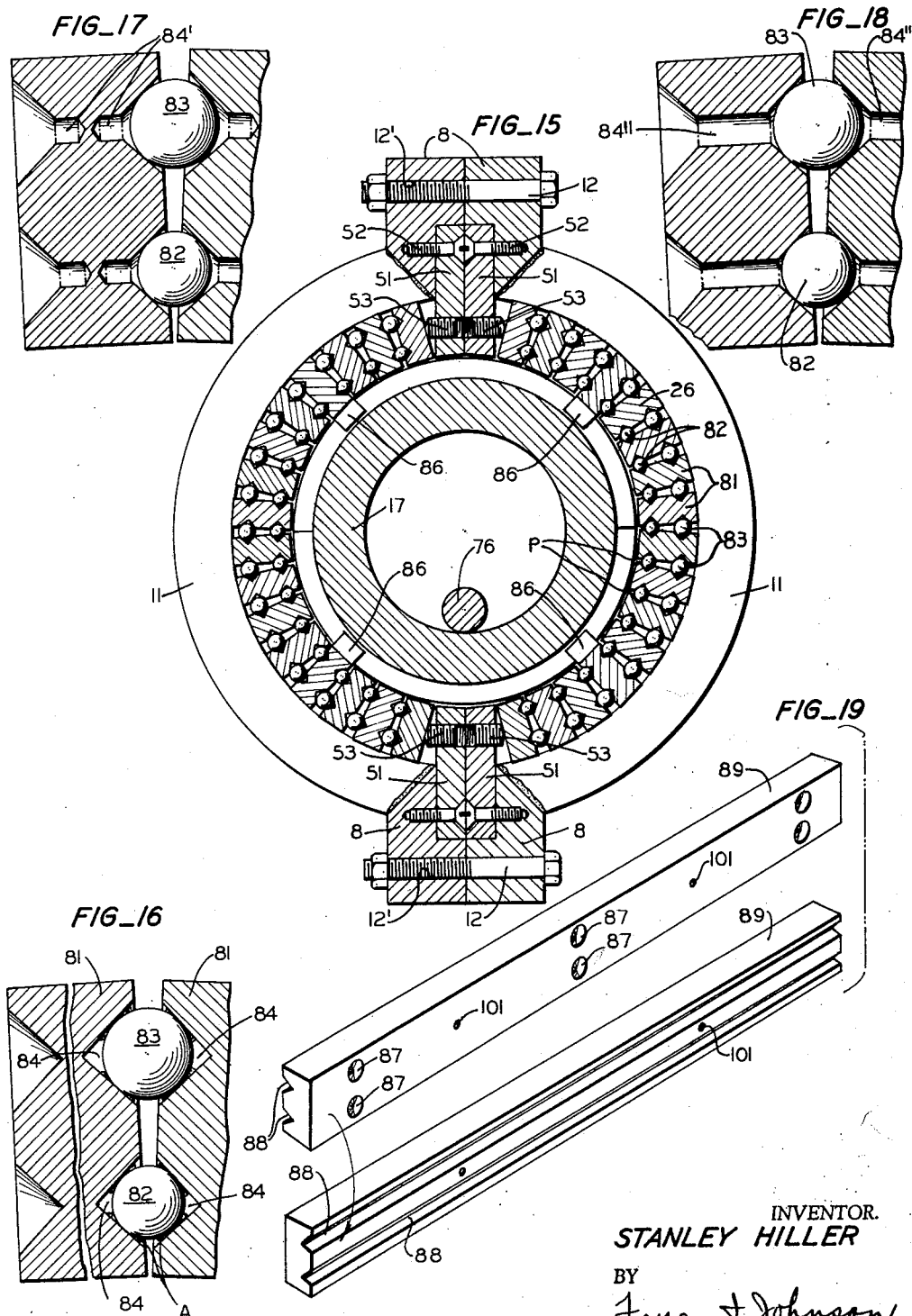

April 28, 1964 S. HILLER 3,130,666
PRESS AND CAGE ASSEMBLY
Filed Aug. 24, 1959 7 Sheets-Sheet 6
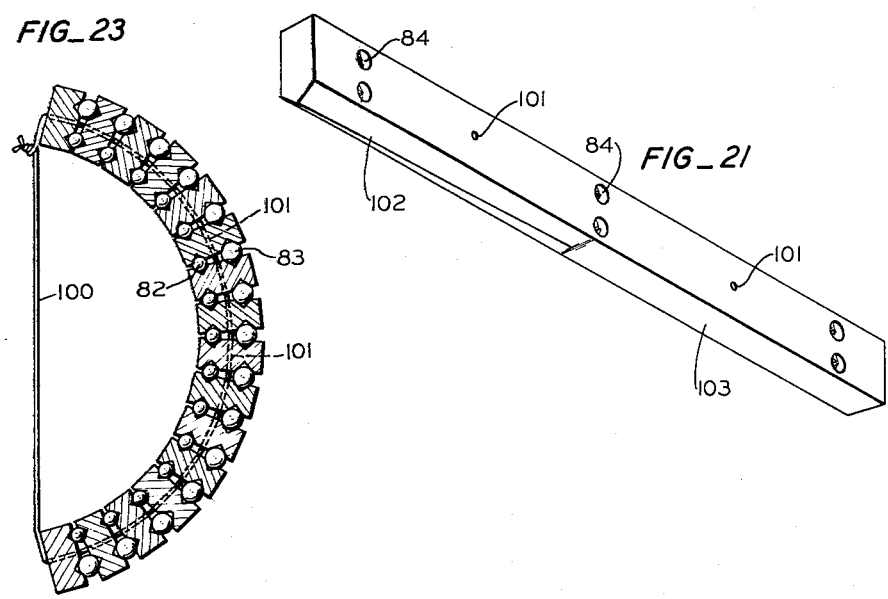
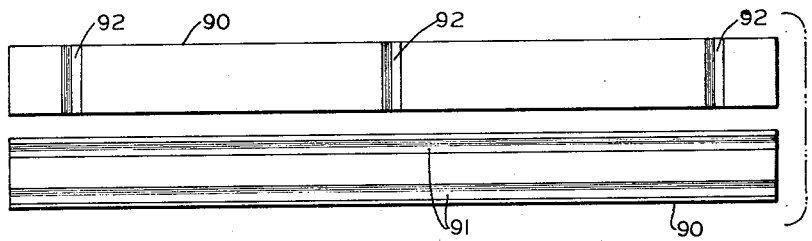
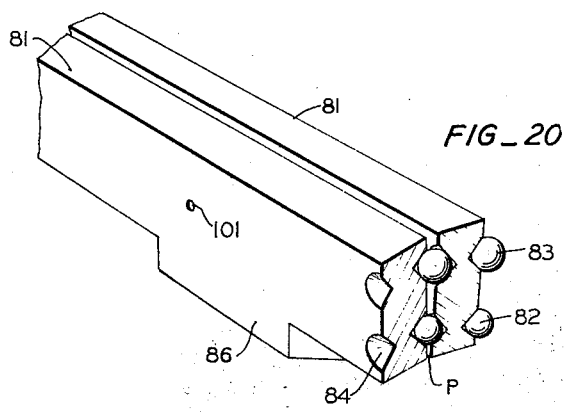
INVENTOR.
STANLEY HILLER
BY
*Fryer & Johnson*
ATTORNEYS

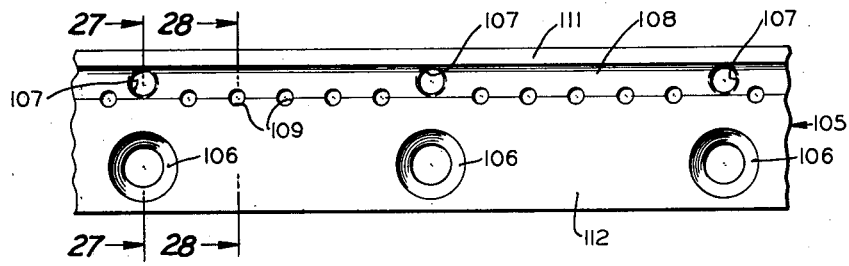
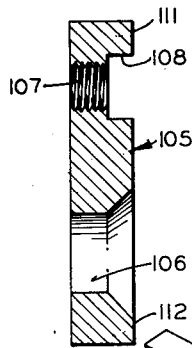
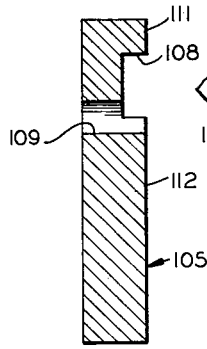
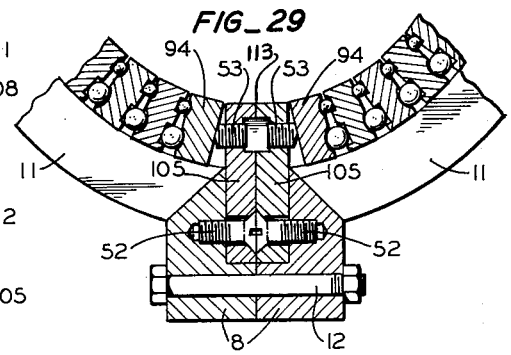
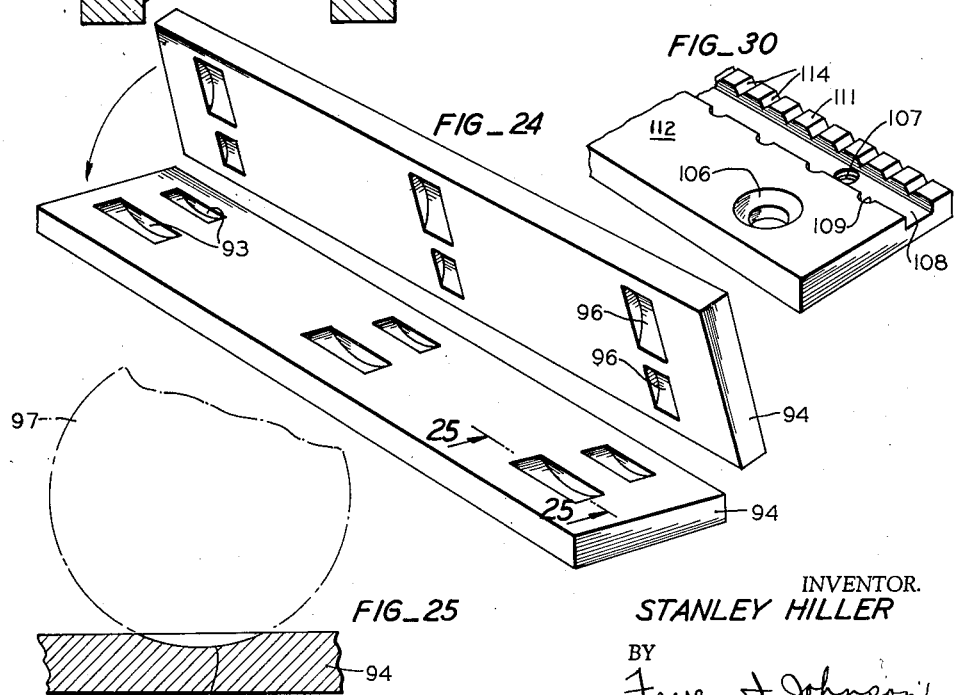

United States Patent Office 3,130,666
Patented Apr. 28, 1964

3,130,666
PRESS AND CAGE ASSEMBLY
Stanley Hiller, Berkeley, Calif., assignor to Coproducts Corporation, San Francisco, Calif., a corporation of California
Filed Aug. 24, 1959, Ser. No. 835,698
32 Claims. (Cl. 100—93)

This invention relates generally to an apparatus and method for mechanically expressing fluids from fluid bearing materials. More particularly, this invention relates to a press cage assembly of the grid-type and to rotary pressure screw means which cooperate with the cage assembly to provide a high pressure fluid expressing press for extracting fluids such as oil, fat or juice from fluid bearing material fed to the press. The press and cage assembly of the present invention and the various components thereof are particularly well adapted for use in material treating systems intended for the processing of various fluid bearing materials such as coconut meat, soya beans, fish, animal meat, cotton seeds, apples or other fruits and the like. The invention may be employed, however, in systems for treating other fluid bearing materials which are susceptible to fluid extraction upon the application of pressure.

Summarizing this inventon, its objects among others, include the provision of a novel press and cage assembly comprised of a plurality of grid body sections each of which is defined by a series of elongated grid bars spaced to provide substantially unrestricted fluid drainage slots between adjacent bars; the provision of novel grid bars for use in such assembly; the provision of rigid spacer means to be interposed between adjacent grid bars to automatically position adjacent bars to provide drainage passages therebetween; the provision of grid bars having means thereon for maintaining pressure in the press by compensating for volume changes in material being treated as the same progresses through the press and for preventing rotation of such material during the fluid expressing operation; the provision of grid bars which may be assembled into cage grid section for transportation and insertion into a press as a unit; the provision of retaining plates or hold-down bars having fluid drainage enhancing means therein; the provision of retaining plates having grid bar adjusting means engageable therewith; the provision of a novel hollow screw shaft for rotation in the press cage assembly; the provision of means in the screw shaft for precluding internal deposit build-up therein; and the provision of a novel method for expressing fluid from material. These and other objects will become evident from reading the following description.

The fluid expressing press of the present invention is an improvement over the press disclosed in Hiller et al. Patent 2,149,736 granted March 7, 1939. Similarly, the press of this invention is an improvement over the press disclosed in copending application, Serial No. 584,584, filed May 14, 1956, now abandoned of which this application is a continuation-in-part. For a thorough discussion of the general principles of operation of a rotary type screw press in expressing fluid from fluid bearing material, reference is directed to the aforementioned patent and application.

Fluid expressing presses have been known in the art heretofore and commonly employ rotary compression screw shafts therein for treating material fed into such presses to express fluid therefrom by compressing the material between the screw shaft and the press cage. However, such prior art constructions consume large quantities of power in the pressing operation and fail to obtain uniformly high quality results in that fine particles of material being treated frequently are expressed from the press with the extracted fluid. The construction of the present press, however, permits generation of high pressures therein while requiring less power than heretofore and without discharging quantities of fine particles of material with the fluid which is extracted.

Surrounding the screw shaft in the present press is a generally cylindrical annular press cage grid assembly comprised of a plurality of spaced elongated grid bars which are separated from each other by various spacer means to provide substantially radial discharge passages. Upon rotation of the screw shaft in the bore of the press, the material in the press is compressed between the screw and the grid assembly and fluid in the material is expressed therefrom and discharged generally radially through the discharge passages to the exterior of the press where it is collected for subsequent use. The material from which the fluid has been extracted (hereinafter called meal) is discharged from the end of the press. An important feature of this invention as will be pointed out fully hereinafter, resides in the novel construction of the grid cage assembly of the press which produces effective oil extraction to provide large quantities of free oil which are substantially unaccompanied by fine meal particles.

Novel features of the present invention over previously known screw type presses will become evident from the following disclosure, reference being directed to the accompanying drawings in which:

FIG. 1 is a side elevational view of the press assembly and the power source therefor;

FIG. 2 is a longitudinal vertical section of the press assembly of FIG. 1 on an enlarged scale relative thereto;

FIG. 3 is an isometric view of a grid bar employable in the press;

FIG. 4 is an isometric view of a modified grid bar having pressure maintaining and rotation preventing damming projections extending from one surface thereof;

FIGS. 5 and 5a are side and plan views, respectively, of a tapered grid bar of the type employed in the feed section of the press;

FIG. 6 is a vertical section taken in the plane of line 6—6 of FIG. 2;

FIGS. 7 through 12 are vertical sections taken in the planes of lines 7—7 through 12—12, respectively, of the pressure section of the press of FIG. 2;

FIG. 13 is an isometric view of a grid body section of a press, the section illustrated being that employed at the discharge end of the press;

FIG. 14 is an isometric view of grid bars and spacer means employed therewith as used in the art heretofore;

FIG. 15 is a vertical sectional view similar to that of FIGS. 7 through 12 which illustrates a modified press construction and spacer means employed therewith;

FIG. 16 is a sectional view through a pair of adjacent grid bars of the type shown in FIG. 15 and illustrates details of the spacer means employed and the seats therefor;

FIG. 17 is a sectional view similar to FIG. 16 and illustrating a somewhat modified spacer seat construction;

FIG. 18 is a sectional view similar to FIG. 16 and illustrating a further modified spacer seat construction;

FIG. 19 illustrates another modified spacer seat construction;

FIG. 20 is a sectional view through a pair of adjacent grid bars illustrating the location of the spacer means to provide unrestricted fluid discharge slots therebetween;

FIG. 21 is an isometric view of a modified grid bar construction;

FIG. 22 is a plan view of grid bars of yet another modified construction;

FIG. 23 is a sectional view of a plurality of grid bars having spacers theerbetween maintained in position for transportation or storage as a unit by fastening means connecting the bars together;

FIGS. 24 and 25 are views of still another type of grid bar spacer seat and the manner in which the same may be formed in another modified grid bar construction;

FIG. 26 is a plan view of a portion of a retaining plate or hold-down bar of a modified construction illustrating fluid drainage means provided therein;

FIGS. 27 and 28 are sectional views taken in the planes of lines 27—27 and 28—28, respectively, of FIG. 26;

FIG. 29 is a partial vertical section of a grid cage assembly illustrating the modified retaining plates in the assembled position;

FIG. 30 is an isometric view of part of a retaining plate of still another modified construction.

As noted previously, the present invention relates to a fluid expressing press of the rotary screw type which is intended for extracting fluid, such as oil or fat, from materials such as dried fresh coconut meat, fish, soya beans, cotton seed or the like, and juices or other liquids from fruits or other liquid bearing materials. Referring to FIG. 1, a press construction of this invention comprises a press assembly generally designated 1 which is mounted upon and bolted to a supporting frame or base 2 in the well known manner.

Press 1 is divided into a hollow feeder section 3 and a hollow pressure section 4, the bores of which desirably are longitudinally aligned with each other and which define a continuous internal passageway through the press through which material to be treated is passed. Feeder section 3 includes a feed hopper 6 into which material to be treated is introduced manually or mechanically as desired.

Each of feeder section 3 and pressure section 4 is defined by opposite grid body sections each of which comprises a pair of longitudinally extending flange members 7 and 8 in the feeder and pressure sections, respectively. Extending between the respective flanges of the press sections are a series of arcuate ribs 9 in the feeder section and 11 in the pressure section. A series of bolt and nut fasteners 12 are employed to secure together opposite grid sections of the press by passing the same through appropriate bores 12′ provided through flanges 7 and 8. The respective flanges and ribs of the respective press body sections may be formed as integral castings or the ribs may be welded or otherwise secured to the flanges. It is against the ribs 7 and 8 that outer portions of the series of grid bars which define the passageway through the press are engaged. Because of the arcuate configuration of the ribs, the grid bars define a generally annular press body when the various body sections are operatively assembled.

Extending upright from support base 2 of the press are a series of vertical standards 13 to which base plates 14 of the feeder section and 16 of the pressure section are bolted in the well known manner. By releasing certain of the securing bolts, opposite body sections which make up the press body may be separated from each other to gain access to the press interior for cleaning or for replacing or modifying the arrangement of the grid bars positioned therein.

Extending through the passageway or internal bore through feeder section 3 and pressure section 4 is an elongated hollow screw shaft 17 which, as shown in FIG. 2, is journalled at one end in bearing 18 for rotation. A coupling 19 of any conventional construction may be employed between the other end of the shaft and a power source 21 employed for driving the shaft. Such power source 21 may be of any suitable type but desirably a multi-horsepower electric motor is employed. Stub shaft 22 extends from power source 21 and is operatively connected to screw shaft 17 by coupling 19. Bearing means is employed in the housing of power source 21 for journalling stub shaft 22 so that screw shaft 17, through coupling 19, is properly supported for rotation.

Screw shaft 17 is provided with a longitudinal bore extending throughout its length and the end of shaft 17 remote from power source 21 is capped by a cover plate 23 which is fastened over the end of the shaft by bolts, screws or the like. Cover plate 23 is apertured and a connection 24 for connecting the shaft bore to a source of a suitable shaft cooling medium extends therethrough for a purpose to be described.

Described briefly, operation of the press is as follows: a quantity of fluid bearing material, such as fresh coconut meat dried to a moisture content of below 5%, is introduced mechanically or manually into feed hopper 6 at the bottom of which it is engaged by screw shaft 17, the screw flights of which urge the material longitudinally through the bore of the press and which apply pressure thereto until the majority of fluid (oil in the case of coconut meat) is expressed therefrom. Because the body of the press is provided with substantially radially extending fluid discharge passages each of which is defined by a pair of adjacent grid bars, fluid expressed from the material may pass from the press and can be collected in suitable containers (not shown) positioned on the support base 2 of the press in a well known manner. Because of the high pressures developed in the press, of the order of 10,000 to 30,000 pounds per square inch, the major part, if not all, of the fluid may be extracted from the material being treated. For example, in the case of coconut meat, the oil content thereof may be reduced to a level of 5 to 8% by weight; the oil content of soya beans and cotton seeds may be reduced to approximately 2½% and 3% respectively; and the oil content of meat scraps or fish may be reduced to from 6 to 10%. Lower oil contents also are obtainable but the above listed levels produce meals which are acceptable commercially.

While, as noted previously, rotary type screw presses have been known in the art heretofore, the constructions thereof do not produce results that are all that could be desired. It has long been a problem with rotary screw presses that material moved by the screw tends to rotate therewith. This condition detracts from the build-up of pressure necessary to obtain effective fluid extraction. Also, rotation of material with the screw under high pressure results in burning of material due to the high frictional heat produced. Similarly, rotatable damming restrictions or mechanical ring-like stops have been provided on the screw shafts of the prior art presses, as disclosed in aforementioned Patent 2,149,736, for the purpose of periodically restricting movement of material through the press and to cause the same to back up so that substantial pressure in the press can be produced. Such damming rings increase the tendency of the material to rotate with the screw and also force the material outwardly radially so that fine particles of meal are extracted with the fluid. Likewise, adjustable rings, orifices or like complicated mechanisms have been provided at the discharge end of prior art presses for restricting the discharge opening so that a final pressing operation can be effected before the material is discharged from the press. These features as noted have not produced entirely satisfactory results in the final product and require the use of unnecessary amounts of power and unnecessary expense in operation.

Similarly, although attempts have been made with prior art devices to prevent rotation of material with the rotary screw by providing so-called knife bars on the grid bar retaining plates of the press as disclosed in aforementioned Patent 2,149,736, the number of such knife bars usable and their effectiveness is limited. This is so because only two diametrically opposite retaining plates are used in each semi-cylindrical press body section. As a result, the total number of knife bars at any given cross-section of the press is limited to two.

With the present invention, however, press body grid bars are provided which employ immovable damming projections thereon which perform the dual function of precluding rotation of material as it passes through the press so that damage due to frictional heat is minimized and which also compensate for changes in volume of material as fluid is expressed from the material so that pressure may be maintained at least constant throughout the press section or may be progressively increased therethrough so that most effective fluid extraction can be produced. Because such projections are provided directly on the grid bars, their position, location and number may be modified as desired to compensate for change and decrease in material volume during the fluid extraction process. That is, the number of such projections at any given press cross-section can be progressively increased from the infeed end of the press to the discharge end so that compensation for decrease in material volume can be made by decreasing the volume of the passageway through the press through which the material is movable.

Furthermore, because the damming projections of the present press extend generally radially into the press passageway from the body thereof, rather than extending radially outwardly from the screw shaft as was true of the prior art constructions, movement of material through the press in a straight path is effected and tendency of the material to be forced radially outwardly also is prevented. As a result, the forcing of fine particles of material radially outwardly with the expressed fluid is greatly minimized. Therefore, highly satisfactory results are provided with this press. In addition, no expensive and complicated adjustable rings, orifices or like mechanisms are required at the discharge end of the press as was heretofore common.

Referring to one embodiment of grid bar employable with the press of this invention, reference is directed to FIG. 3 in which a grid bar 26 having a substantially rectangular cross-section defined by opposite side faces 27 and opposite surfaces 28 extending between such side faces 27 is disclosed. Spacer means in the form of wedge shaped spacer elements 29 project laterally from opposite side faces 27. The function of the spacer elements 29 is to maintain separation of adjacent grid bars so that a substantially radial fluid discharge passage may be provided between adjacent bars when the bars are positioned in a press body. Because the spacer elements 29 are wedge shaped, each fluid discharge passage (designated P in the drawings) is imparted with a flaring configuration which widens from the interior to the exterior of the press cage body so that fluid flow may be easily effected. Furthermore, because spacer elements 29 are of very narrow width compared to the overall length of the bar and because such elements are widely spaced along the length of the bar, each fluid passage defined between adjacent bars is substantially unrestricted adjacent the press body interior so that fluid flow is substantially unrestricted. Because the spacer elements desirably are arranged uniformly on the respective grid bars, the spacers of one bar provide seats for the spacers of the adjacent contacting bar.

While in the embodiment illustrated in FIG. 3 spacer elements are provided on each of the opposite faces 27, it should be understood that, as an alternative construction, spacer elements could be formed on only one of the side faces of the bar. With such construction, a discharge passage would be effected between a pair of bars by the spacer elements of one bar engaging a planar face of the other bar.

FIG. 4 illustrates a grid bar 30 of the general type shown in FIG. 3, but which includes damming means thereon for performing the dual purpose of maintaining pressure in the press by compensating for changes in volume of material being pressed and precluding rotation thereof. Such means is in the form of spaced damming projections 31 which project from one surface of the grid bar and extend in a direction generally parallel to the opposite side faces of the bar from which spacer elements 29 project. The height of the projections may be varied depending upon press size, the material being pressed, etc. With the exception of projections 31, the bars shown in FIGS. 3 and 4 desirably are the same and the location of the spacer elements thereon identical. In this manner, bars of the type shown in FIGS. 3 and 4 may be alternated in any arrangement desired in an assembled press cage. While in FIG. 4, two damming projections are shown on the bar, it should be understood that the number and location of such projections on a bar may be modified as desired to produce the desired results in an assembled press. The leading end of the projections may be rounded, as shown in FIG. 4, or pointed or tapered as shown in FIG. 13.

Because of the simple construction of these bars, the same may be cast in the configuration shown in FIGS. 3 and 4 from any suitable hard, strong material, such as alloy steel or the like. Thereafter the only machining which may prove desirable is a grinding operation in which all wedge shaped projections 29 may be finished off simultaneously to insure that the same all have their outer faces lying in the same plane so that rigid seats are provided for spacers of adjacent bars.

The grid bars thus described are usable throughout the pressure section 4 of the press and also may be employed closely adjacent the infeed end of the feeder section 3 of the press. However, a particular type of inclined grid bar of the type shown in FIGS. 5 and 5a is employed in one portion of the feeder section where the bore of the feeder section is reduced in diameter to produce an initial stuffing or fluid expressing operation. Such inclined bars are designated 32 and have opposite side faces 33 and 34 which are inclined relative to each other and which converge towards one end 36 of the bar and diverge toward opposite end 37. Spacer elements 38, 39 and 40 are provided which project from each of such opposite side faces and such spacer elements extend from the respective side faces a distance which increases progressively towards end 36 of the bar.

Inclined bar 32 also includes opposite surfaces 41 and 42 which extend between side faces 33 and 34. These opposite surfaces 41 and 42 also are inclined relative to each other and converge towards end 37 of the bar and diverge toward end 36 as shown in FIG. 5. In this manner bar 32 is imparted with a dual inclined construction by means of which the bore of the press in the feeder section may be transformed from a larger diameter to a progressively smaller diameter.

The construction of the press cage body is illustrated in FIGS. 2 and 6–13. The filler section 3 of the press comprises upper and lower grid body sections in the upper of which the feed hopper 6 mentioned previously is positioned. The flanges 7 of the respective upper and lower sections between which the arcuate ribs 9 extend are generally horizontally arranged so that the upper section and the attached feed hopper may be withdrawn from the lower section so that access may be gained to the press interior. This is in distinction to the arrangement of the flanges 8 of the pressure section 4 which are arranged generally vertically so that the opposite cage sections thereof may be separated from each other by removing all but the two bottom retaining bolts securing the same to upright standards 13 and pivoting the opposite cage sections outwardly relative to each other about such bolts to expose the interior thereof. The construction illustrated in FIG. 1 with the flanges 7 of the feeder section being aligned generally in the same horizontal plane is preferred so that the feed hopper 6 may be positioned at one end of the upper half of the cage body of the feeder section so that cutting away of flanges 7 is not necessary as would be the case if such flanges were positioned in the same vertical plane as is true of the flanges 8 in the pressure section.

The grid body of the feeder section desirably is defined into three series of circumferentially arranged grid bars having side faces of adjacent bars opposing each other and spaced from each other by spacer elements interposed therebetween to define fluid flow passages P. (See FIG. 6.) In this manner the body of the feeder section is provided with an annular bore 46 which extends through the feeder section and communicates with and is axially aligned with an annular bore 45 in the pressure section 4 of the press as shown in FIG. 2. While grid bars of long, one piece construction could be used, desirably shorter grid bars which may be more easily produced and heat treated when necessary without attendant distortion are employed. In the feed section illustrated, three lengths of longitudinally arranged bars positioned in abutting end to end relationship are employed to define the grid body thereof. The bars in the first two series 47 and 48 desirably are of the construction shown in FIG. 3 which are free of radial damming projections so that the bore 46 in the areas of these bars has a substantially circular inner periphery as shown in FIG. 6. However, in section 49 of the feeder section, tapered bars 32 of the type illustrated in FIGS. 5 and 5a are employed to impart a tapered or conical configuration to the bore 46 to reduce the diameter thereof to the same size as that to be employed in the pressure section of the press.

As shown in FIG. 6, the face to face flanges 7 are horizontally arranged and grid bar retaining plates 51 extend generally radially from each of such flanges and are removably secured thereto by screw connectors 52 or the like which pass through appropriate holes provided in the retainer plates and which are threaded into tapped holes provided in arcuate ribs 9. The retaining plates employed in the feed section are of the type illustrated in FIGS. 2 and 8 and used in the pressure section of the press. Desirably such retaining plates, while the same could be of single elongated construction, are of a length substantially equal to the lengths of the grid bars which they maintain in position.

The retaining plates are provided with means for adjustably urging the respective grid bars into engagement with each other and with the arcuate ribs of the cage body so that the cage body is capable of withstanding the tremendous torsional forces produced when screw shaft 17 rotates during the fluid expressing operation. Such means comprises a series of set screws 53 which extend through threaded bores in the retaining plates 52 engage the side surfaces of the grid bars positioned adjacent the respective retaining plates. Any suitable number of such set screws may be employed with a retaining plate, but desirably four or five such screws are used for each retaining plate.

Set screws 53 are particularly effective in that they preclude the need for accurate tolerances being maintained during manufacturing of the grid bars; furthermore the set screws allow the grid bars to be adjustably urged toward each other to compensate for wear in the grid bars as the same are eroded or worn due to the passage of fluid from the press under the high pressure generated therein. In addition, the set screws are effective to provide additional fluid drainage passages in that the grid bars positioned adjacent the respective retaining plates can be spaced therefrom a predetermined distance so that fluid may flow between the retaining plate and the adjacent grid bar.

Desirably the retaining plates 51 also are provided with radially projecting knife bars 54 as shown in FIGS. 2 and 6. Such knife bars have been known broadly in the art heretofore as disclosed in the aforementioned Hiller et al. Patent 2,149,736. However, the use of such bars heretofore has been limited solely to attempts to preclude rotation of material carried through the press. Because the number of such bars heretofore usable was limited, the results obtained have not been highly successful. In the embodiment shown in FIG. 6, each of the adjacent retaining plates 51 is provided with longitudinally spaced series of knife bars arranged face to face to provide series of material rotation preventing projections.

The grid body section 49 adjacent the pressure section of the press as described previously is defined by a series of tapered bars 32 of the type shown in FIGS. 5 and 5a. Bars of this character also are arranged side by side and separated from each other by spacer elements provided to define a series of substantially radial discharge passages P therebetween. Because the bars are arranged with their opposite inner and outer surfaces 41 and 42 diverging in the direction toward the pressure section 4 of the press, the bore 46 through the feed section is progressively decreased in diameter and a conical restriction is provided. Because the side faces 33 and 34 of the bars 32 longitudinally converge in the direction toward the pressure section of the press, substantially uniform dimension discharge passages may be maintained about the periphery of the grid body in the section 49 thereof.

As material is fed into the press through the feed hopper and fed toward the pressure section 4 by screw shaft 17, the restricted conical section 49 effects an initial compression of the material so that voids in the material are filled and the material is more or less stuffed to compact the material to facilitate subsequent fluid extraction. In this manner, air introduced into the press with the material may be driven off and also an initial fluid extraction may be effected.

The bore 47 in the pressure section 4 of the press is defined by three separate annular series 56, 57 and 58 of grid bars which are arranged to maintain bore 47 of substantially constant internal diameter throughout its full length. That is, with the exception of volume compensating and rotation preventing damming projections provided on the bars as will be described, the periphery of bore 47 takes the form of a right circular cylinder. In the pressure section, grid bars of both types shown in FIGS. 3 and 4 are employed in varying arrangements starting from the end of bore 47 adjacent to feeder section 3 of the press and varying toward the discharge end 59 of the press. That is, as shown in FIGS. 7 through 12, the grid bars of the body of the pressure section are arranged so that damming projections are positioned to extend substantially radially inwardly from the periphery of the bore 47 to fill up the passageway and to restrict the passage of material through the passageway to compensate for changes in volume of the material as fluid is extracted from the material progressively during its travel through the pressure section.

In the infeed end of the pressure section, such projections may be defined by diametrically opposite knife bar projections 54 provided on retaining plates 51 as described previously if so desired. Thereafter, however, grid bars of the type shown in FIG. 4 are alternately interposed in varying arrangements between the retainer plates, desirably in a regular pattern, so that the number of such projections progressively increases toward the discharge end of the press. In this manner the volume of the bore 47 in the pressure section is progressively decreased so that pressure in the pressure section may be maintained at least substantially constant and desirably is progressively increased toward the discharge end. That is, the projections 31 on the grid bars and 54 on the retaining plates compensate for the loss of volume of the material as a result of fluid expressed radially through the discharge passages of the press and progressively fill up the spaces between adjacent screw flights on the rotatable screw shaft 17 passing therethrough.

Initially as shown in FIG. 7, only two diametrically opposite projections are employed at the entering end of the pressure section, while, referring to FIG. 12 which is a section taken immediately adjacent the discharge end 59 of the press through which the low content oil meal is discharged, substantially every other grid bar in the press is provided with such projections so that the volume of the bore 47 in this location is substantially reduced to about 50% of the volume at the entering end of the pressure section.

While in FIGS. 7 to 12 the arrangement of the projections has been illustrated as being varied in a generally regular manner from a projection extending inwardly from between each eighteenth grid bar at the entering end to a projection on every other grid bar at the discharge end as shown in FIG. 12, the exact arrangement and number of projections employed may be varied depending upon the material being treated and its fluid content. The arrangement illustrated, however, has proved satisfactory for expressing oil from coconut meat, which in the fresh, wet condition contains up to 30% oil. After the majority of the water is dried from the meat in any suitable manner, in which dried condition the meat is introduced into the press, the expressible oil content thereof is about 62% by weight, which is reduced in the press to an acceptable level of from 5 to 8%.

In this manner it should be understood that the projections employed serve as dams which fill the gaps between adjacent screw flights of the screw shaft. However, such dams are in distinction to prior art arrangements in which rotatable conical rings or the like were provided directly on the screw shaft for rotation therewith which produced undesirable rotation of the material and forced the same radially outwardly with oil expressed from the material. With the present construction, however, because the damming projections are stationary and extend inwardly from the periphery of the bore 47 of the pressure section of the press, the same do not effect undesirable rotation or radial outward movement of the material, but serve as stoppers to compensate for volume changes in the material as fluid is expressed and to maintain pressure in the press. Furthermore, the projections thus employed insure that the material moved by the screw shaft cannot rotate therewith, but rather force the material to travel in a straight path through the press.

The screw shaft 17 employed with the press, as a result of the use therein of volume compensating projections as described, need not have an expensive tapered or like modified construction. As shown in FIG. 2, desirably the shaft has a uniform root diameter 61 throughout its length. As a result the shaft does not require expensive machining operations or the like which heretofore have been employed in providing screw shafts of varying root diameters or those having damming cones or the like along their length. The screw flight on shaft 17 desirably is of a discontinuous nature which divides the flight into a series of separate flight sections numbered 62 through 70 extending from the infeed end to the discharge end of the press respectively. In the feeder section 3 of the press the first screw flight 62 is defined by several convolutions which have uniform crest diameter and uniform pitch. However, the succeeding discontinuous screw flights 63 and 64 progressively decrease in crest diameter and pitch to correspond to the conical configuration imparted by tapered bars 32 to converging conical section 49 of the press body. This construction results in the initial stuffing action and fluid extraction mentioned previously.

In the pressure section 4 of the press, screw flights 65 through 70, while discontinuous, all are of the same pitch and crest diameter. As a result, heretofore employed methods of tapering the root diameter or employing tapered flights on the screw shaft to effect compression of material is precluded in that pressure maintenance is assured as noted previously by the damming projections extending into the bore 47 of the pressure section and progressively increasing in number along the length thereof towards the discharge end.

As shown in FIGS. 2 and 7 to 12, projections 31 and 54 employed for this purpose have their radial inner ends positioned closely adjacent to the root 61 of the shaft with normal operating clearance being all that is necessary.

Because substantial pressures are developed in the press as noted previously, large amounts of heat are generated during the fluid expressing operation. As a result it is desirable to cool the screw shaft during its use. For this purpose shaft 17 is provided with a longitudinal bore 75 throughout its length into which a cooling medium is introducible through the connection 24 described previously. The cooling medium may be withdrawn from adjacent the opposite end of the shaft in any well known manner so that flow through the shaft may be continuous for most effective cooling.

The cooling medium chosen may be any suitable fluid and desirably water is employed. While water has been used heretofore for cooling screw shafts, a problem results from use of water in that natural materials such as lime, iron particles and the like which are introduced into the shaft with the water tend to build up on the periphery of the shaft bore as hard deposits. Upon continued use of the shaft, such deposits gain substantial thickness and the heat conduction from the shaft to the bore thereof is materially reduced. Accordingly, in the present invention means is provided for precluding the building up of such deposits so that the water used to cool the shaft need not be pure. For example, fresh or salt water direct from rivers or the ocean may be employed.

Such deposit precluding means desirably comprises a rollable member or members 76 positioned in the bore 75 of the shaft and movable about the periphery thereof as the shaft is rotated. While the rollable member or members may take various forms, in the embodiment illustrated an elongated rod which extends substantially the full length of the shaft is employed. Such rod is illustrated as being circular in cross-section but the same may be polygonal in cross-section so that more of a tumbling effect will be produced when the screw shaft rotates. Also, series of metal balls or the like may be employed in the shaft for this purpose also. Upon rotation of the shaft the rod 76 periodically engages the entire surface of the inner periphery of the shaft and any deposits which tend to form thereon are dislodged and may be flushed from the shaft bore with the cooling medium when the same is removed therefrom.

While grid bars of the type shown in FIGS. 3 and 4 are highly effective and satisfactory for their intended purpose, the spacer elements 29 integrally provided thereon require a particular configuration to be imparted to the bars which departs from the substantially rectangular configuration of cage bars heretofore employed in the art. Because it is desirable to employ substantially rectangular cage bars whenever possible because of the availability of the same and their relative low cost, attempts have been made in the art heretofore to employ separate spacer elements which are affixed to the cage bars and interposed therebetween when the same are inserted into a press cage assembly.

As shown in FIG. 14, a frequently used prior art construction involves sheet metal shim type spacer elements 80′ which have deflected spaced fingers 81′ struck therefrom which are intended to provide a flaring discharge slot 82′ between a pair of similar substantially rectangular cross-section grid bars 83′ of the type readily available. However, it should be readily apparent that the sheet metal spacer elements 80′ and the deflected fingers 81′ thereof have little strength and cannot adequately resist the tremendous torsional forces applied to the grid bars by the tremendous pressures developed in the press. In fact, the deflected fingers are insufficient to resist the weight of the bars during assembly of the press.

Spacers of this prior art type cannot readily be made from a more rigid sheet metal of a heavier gauge, in that to do so would impart an undesirably wide dimension to the discharge passages between adjacent grid bars at the inner periphery of the grid cage assembly which would allow particles of material to be discharged with oil expressed from material in the press. In addition, when spacers of the type illustrated are employed, a substantial portion of each discharge slot is blocked off by the spacer elements. Accordingly, fluid flow is restricted to a large extent by the spacers of this character. This invention, therefore, also relates to the provision of novel rigid and strong spacer means which are usable with readily available grid bars which have a substantially rectangular cross-section. In this connection reference is directed to FIGS. 15 to 24 in which various grid bar constructions embodying the novel spacer means of this invention and the manner in which the same are arranged in a grid cage assembly are illustrated.

Desirably such spacer elements comprise inner and outer series of spherical balls or ball like elements interposed between adjacent grid bars and positioned in suitable seats provided in the side faces of the generally rectangular cross-section grid bars. Desirably such spacer balls are of the conventional ball bearing type which are readily available and relatively inexpensive because they are standard items of commerce.

FIG. 15 illustrates the manner in which such ball type spacers are employed in a press body with the inner and outer series of spacers interposed between adjacent grid bars. Desirably the inner series of spacers are of less diameter than the outer series so that a flaring configuration is imparted to the respective discharge passages extending between adjacent grid bars. Bearings of ¼ inch and ⁵⁄₁₆ inch diameters have been found suitable.

It should be noted that the inner series of spacers are positioned radially outwardly from the inner portion of the respective grid bars (FIGS. 15 and 20) so that the discharge passages P are unrestricted adjacent the periphery of the bore extending through the press body so that fluid may flow therethrough in an unrestricted manner. This construction materially increases the flow rate of fluid through the press in that the inner portions of the discharge passages are not in any way restricted as has been true heretofore. With this construction, it has been found that fluid flow from a given press may be increased up to 25% over conventional constructions.

While the flaring configuration through the discharge passages could be provided by using spacers of the same diameter and by modifying the relative sizes of the seats for the spacers provided in the grid bars, the arrangement illustrated is more desirable in that series of seats of the same configuration and size may be simultaneously provided in the bar faces, such as by drilling, broaching, milling or the like.

Referring to FIG. 16, a pair of adjacent grid bars 81 are maintained spaced from each other by an inner spacer 82 and an outer spacer 83 of different diameters. Conical seats 84 are provided in opposing faces of the respective grid bars by drilling or the like and are alignable with each other when the bars are positioned in opposing relationship to receive the different size spacers to impart a flaring configuration to the discharge passage therebetween. By employing conical seats of approximately 95°, a discharge slot about .012 inch wide at its inner end having a flare of about 9–10° may be provided.

To facilitate making up a grid body section with grid bars and spacers of this type, the spacers may be maintained in the seats in one face of a bar by using portions of adhesive or grease A as shown in FIGS. 16 and 20 so that it is merely necessary to position a bar having spacers projecting from one face thereof into engagement with another bar located against the first bar. If desired, however, the spacers can be individually applied to the respective seats when the cage body is assembled.

It should be understood that grid bars of this construction also may be provided with series of damming projections 86 as shown in FIGS. 15 and 20 for the hereinbefore described dual purpose of precluding material rotation and of maintaining pressure in the press by compensating for material volume changes as fluid is expressed from the material.

As shown in FIGS. 17 and 18, conical seats may be provided in the bars in different manners. In FIG. 17, partial bores 84' are provided in the bars while in the embodiment of FIG. 18, bores 84'' are drilled entirely through the bars as illustrated.

FIG. 19 shows a further modified construction in which spaced conical seats 87 are provided in one face of a rectangular grid bar while elongated grooves 88 having a substantially V-shaped configuration are provided in the opposite face of the grid bar 89. Because such grooves may be inexpensively milled in the grid bar, this construction provides a less expensive arrangement than with drilled bars. It should be understood that when spacers are positioned in seats 87 provided therefor such spacers will be receivable in the spaced slots 88 provided in the opposite face of the adjacent bar. Separation of the spacers from between the bars will be precluded by their secure engagement with the conical seats in the one bar.

A further embodiment which permits seats to be formed in the bars entirely by milling is illustrated in FIG. 22 wherein similar bars 90 having a pair of longitudinally extending V-shaped slots 91 provided in one side face thereof and a series of transversely extending V-shaped slots 92 provided in the opposite side face thereof are shown. In this manner, when similar bars are arranged with spacers therebetween, such spacers are maintained in a predetermined position in that the same are restrained against longitudinal movement relative to the bars by the side walls of the transverse slots 92 and similarly transverse movement of the spacers from between the bars is precluded by the walls of the longitudinal slots 91 of the adjacent bar.

Because bars employable in a high pressure press of the type herein disclosed must be of very hard construction to withstand the frictional wear and torsional forces applied thereto, frequently such bars are heat treated to a high hardness after the spacer seats have been drilled or milled therein as described. Generally such heat treating operations are expensive and it frequently is desirable to dispense with such operations wherever possible. The grid bar construction shown in FIGS. 24 and 25 is provided so that seats may be formed in the bar faces after heat treating or, alternatively, such bars may be cast from exceptionally hard material so that heat treating is unnecessary. In this manner seat dimensions will not be changed as often results during heat treating.

In this arrangement, arcuate seats 93 are provided in one face of each bar 94 which extend generally longitudinally of the bar while similar arcuate seats 96 are provided in the opposite face of the bar which extend generally transverse to the longitudinal axis of the bar. That is, the major axes of seats 93 extend longitudinally of the bar while the major axes of seats 96 extend transversely of the bar. With this construction any number of seats 93 and 96 can be simultaneously ground with conventional grinding wheels 97 as illustrated in FIG. 25 with equipment commercially available. As a result, seats may be provided directly in hard materials so that the need for subsequent heat treatment is precluded. Because the axes of the groove type seats in opposing faces of the bars 94 extend in different directions movement of the spacer elements to be positioned in the seats is precluded.

When spacer elements of the various types illustrated are provided between adjacent bars in the various manners described, the resulting cage body is highly resistant to torsional stresses and tremendous pressures produced in that the spacers preclude both longitudinal and transverse movement, as well as twisting movement of adjacent bars relative to each other so long as the respective bars of the arcuate unit are maintained securely engaged with each other by the respective retaining plates 51 or by other retaining means. As a result, a series of bars having spacers interposed therebetween may be fastened together and transported as a unit for assembly as a unit into a press. This arrangement is highly desirable in that such a unit may be assembled mechanically in a factory or the like and transported to the press as a replacement for a worn-out cage assembly or the like and inserted in toto into the press rapidly and easily thereby dispensing with expensive labor costs.

Desirably fastening means of the cable type are employed to secure together a press cage unit. As shown in FIG. 23 such a cable type fastener may take various forms including that of a conventional wire or metal cable 100 connected together at its ends which passes through appropriate holes 101 provided through respective cage bars of the unit as shown in FIGS. 19 and 20. In this manner a half cage section may be transported as a unit and easily inserted into a press into engagement with the arcuate retaining ribs provided.

A further modification of a cage bar is shown in FIG. 21. This arrangement employs standard conical seats 84 of the type shown in FIG. 16 but additionally includes a triangular shaped damming projection 102 which extends from one surface 103 thereof. Projection 102 increases in height towards the end of the bar from adjacent the middle thereof so that the blocking effect produced by the projection increases progressively toward the end of the bar. Bars of the type shown in FIG. 21 are primarily intended for use immediately adjacent the discharge end of the press (such as in a grid section of the type shown in FIG. 13) so that a final compression of material just before it is discharged from the press may be effected. The number of such bars placed about the periphery of the bore of the press may be varied as desired depending upon the material being treated.

Because it is desirable that all possible passages be provided about the periphery of the press bore so that fluid may more easily be extracted and withdrawn therefrom, a modified retaining plate construction is illustrated in FIGS. 26 to 30 which differs from the substantially rectangular cross-section retaining plates 51 described previously. In this embodiment, retaining plate 105 has provided therein countersunk through bores 106 for the reception of conical headed screws 52 of the type described previously. In addition the retainer plate also has threaded bores 107 through which adjusting set screws 53 are extendable, also as described previously. However, the retaining plate illustrated has a longitudinal slot 108 extending from end to end thereof and also has a series of transverse fluid passages 109 extending transversely therethrough. Passages 109 communicate with longitudinal slot 108 so that fluid entering slot 108 may pass therefrom transversely through retaining plate via passages 109.

As shown in FIG. 29 a pair of retaining plates 105 are arranged in face to face engagement with set screws 53 engaged with adjacent grid bars 94 of the type described previously with respect to FIG. 24. Because the pressures produced in the press are very high, it is possible for fluid to pass radially through and between the upper sections 111 of the retaining plates which are divided from the lower sections 112 thereof by the elongated slot 108 described previously. That is, even though no open passage is provided between the face to face retaining plates, fluid may flow radially therethrough in that the plates are forced slightly apart by the tremendous pressures produced in the press through a passage 113 which results when the press is in operation. Fluid thus flowing between the retaining plates passes into the elongated slot 108 and thence from the slot through transverse passages 109 into the fluid discharge passages provided between the respective plates 105 and the adjacent grid bars 94.

As noted in FIGS. 26 and 28, desirably the passages 109 are in communication with the slot 108 but are spaced from upper section 111 of the retainer plate as far as possible so that such passages will be spaced radially outwardly the maximum distance when the plates are assembled in the press cage so that fluid is discharged therefrom into a wider portion of the discharge passage defined by the retaining plate and the adjacent grid bar for more easy fluid flow.

While as noted previously the pressure produced in the press is sufficient to force fluid between the face to face upper engaged sections 111 of the retainer plates, under certain conditions it is desirable to reduce the stresses thus produced by providing additional channels, serrations or grooves 114 in the upper section 111 of each of the retainer plates so that fluid may more readily pass between the upper sections 111 of the plates into the longitudinal slots 108 thereof.

With this retaining plate construction, maximum use is made of every possible passageway through the cage assembly from interior to exterior thereof so that a maximum free fluid flow may be effected from the press. This is in distinction to prior art presses in which the sole passages through the press were through and between adjacent grid bars. In addition because, as noted previously, such passages frequently were blocked to a large extent by spacer elements employed therewith, maximum fluid flow was not produced.

For purposes of illustration a press assembly embodying any of the various features disclosed herein will be described with respect to operation of the same for treating an oil bearing material, such as coconut meat, for extracting oil in fluid form therefrom. For treating such material the length of the press illustrated in FIG. 2 is approximately 68 inches with the screw shaft extending longitudinally therethrough in the manner described. The feed section of the press desirably comprises approximately half or 34 inches of the total press length with the press section taking up the remaining 34 inches. The shaft itself has a 5 inch root diameter with a 4 inch diameter bore extending longitudinally therethrough. The diameter of the bore 46 in the feeder section of the press adjacent the feed hopper is 8 inches and decreases due to tapered bars 32 to a 6 inch diameter adjacent the infeed end of the pressure section. Screw flight 62 has substantially an 8 inch crest diameter with a 6 inch pitch. The succeeding screw flights 63 and 64 progressively decrease from an 8 inch crest diameter to a 6 inch crest diameter. Screw flights 63 and 64 also decrease progressively in pitch from 5 inches in flight 63 to 4½ inches in flight 64. Screw flights 65 through 70 in the pressure section all have a 3½ inch pitch with substantially a 6 inch crest diameter to operatively correspond to the 6 inch diameter of bore 47.

In the press embodiment illustrated, 38 grid bars are employed and the number of damming projections used progressively increases toward the discharge end of the pressure section from two at section 7—7 to nineteen at section 12—12. In this manner the volume in the bore 47 of the pressure section of the press is progressively decreased in proportion to the decrease in volume of material treated in the press as fluid is extracted therefrom. Under ideal conditions, if the pressure produced in the press at various sections thereof were plotted against decrease in volume of material being treated, the resulting graph would be defined by a generally straight line.

With this arrangement, the pressure increases proportionally from zero at the hopper end to 12,000 p.s.i. at the discharge end of the press. As noted previously, the pressure produced may be varied by modifying the arrangement of the projections extending into the cage assembly. With this construction the oil content of coconut meat may be decreased, as noted previously, to an acceptable level of from 5 to 8% by weight in the meal particles discharged from the press.

The grid bars employed herewith desirably are of 11 inch lengths, are one-half inch thick and one inch wide. However, because of the high torsional strength of the press ⅜ inch bars also may be used, thereby providing more discharge passages about the press periphery and increased fluid flow. Such bars desirably are of a hardness of from 55 to 65 on the Rockwell C hardness scale and may be carburized or cast directly from a material having the acceptable hardness. The power source 21 employed with the machine is a 50 horsepower electric motor which has more than sufficient power to rotate the screw and produce the desired pressures. Because of the novel construction of the cage assembly which precludes the forcing of fine particles of meal radially with the oil expressed from the material, it has been found that a savings of up to one-third in power result with this construction thereby permitting the use of a smaller essential power source than has been used heretofore.

While the capacity of the press described may vary depending upon the speed of rotation of the screw shaft 17, dried coconut meat having a moisture content of below 5% desirably is fed to the press at the rate of 3000 lbs. per hour, with shaft 17 rotating at approximately 40 r.p.m. On the average dried meat fed into the press contains approximately 62% expressible oil and the oil content of the discharged material is 7% by weight, meaning that approximately 90% of the oil is removed from the material in the press. If higher pressures were employed, obviously a greater percentage of the expressible oil could be extracted from the material, but the removal of oil to the 7% level has been found suitable in that a commercial meal is produced and damage to the meal and expressed oil by burning or the like as a result of excessive pressures is precluded.

While various embodiments of the invention have been specifically described and one operating press system set out for purposes of illustration, the disclosure herein is not intended to be in any way limiting upon this invention and the same should be interpreted in light of the appended claims.

I claim:

1. A cage assembly for a fluid expressing press comprising at least one grid body section, said body section comprising a plurality of discrete grid bars, rigid generally ball shaped spacers separately positioned between adjacent bars for maintaining said bars separated to provide fluid flow passages therebetween, and seats on said adjacent bars with which said spacers are engaged, said spacers being so formed and positioned that said passages are maintained substantially open and unrestricted adjacent the interior of said body section whereby fluid expressed from fluid bearing material in said press may flow freely through said passages from said press body section.

2. A cage assembly for a press for expressing fluid from fluid bearing materials including a feed end and a discharge end and material compressing means extending longitudinally between said ends, said cage assembly comprising opposite sections removably connected together to provide a generally cylindrical press grid body, each of said sections comprising a plurality of grid bars spaced from each other to provide fluid flow passages extending substantially radially between the interior and exterior of said grid body, and rigid generally ball shaped spacers separately positioned between adjacent bars positioned to maintain the spacing therebetween uniform and to maintain said passages open and substantially unrestricted adjacent said grid body interior whereby fluid expressed from said material may flow freely through said passages from said assembly.

3. In a press for expressing fluid from fluid bearing materials, a cage assembly including a grid body comprising opposite body sections, each of said body sections including a plurality of curved ribs connected at opposite ends thereof to spaced longitudinally extending flange members, a retainer plate removably connected to each of said flange members, and a plurality of elongated grid bars maintained with an exterior portion of each grid bar engaged against said curved ribs by said retainer plates, series of rigid spacers between opposing faces of adjacent grid bars maintaining such grid bars spaced thereby providing elongated substantially unrestricted and generally radial fluid flow passages therebetween, said spacers being so formed and arranged that said opposing bar faces diverge in a direction toward the exterior of said grid body thereby imparting a flaring configuration to said passages so that fluid may flow freely therethrough, and adjustably positionable screw means engaged with and extending through each of said retainer plates into engagement with the grid bar adjacent each such plate for adjustably urging the grid bars of said body sections toward each other whereby said grid bars and spacers may be firmly engaged to preclude movement and distortion of said grid bars during operation of said press and to compensate for grid bar wear due to extended use of said press.

4. A press cage assembly comprising a plurality of grid bars arranged in spaced relationship and defining a series of fluid passages therebetween, and a pair of retainer plates secured in said assembly and maintaining said bars therein, said plates each having opposite faces and being positioned in said assembly in face to face engagement with each other, at least one of said plates having a longitudinal drainage slot provided in and extending along the one face thereof which contacts said other plate, said one plate having spaced drainage recesses which are free of restriction communicating with said slot and extending transversely through such plate from said one face to the opposite face thereof, said one plate face being engaged with a face of the other plate of said pair of plates whereby fluid expressed under pressure from fluid bearing material in said cage assembly may be forced from the interior of said cage assembly between said plates and into said slot and therefrom through said transverse recesses to the exterior of said cage assembly.

5. The retainer plate of claim 4 wherein a series of internally threaded bores are provided through said plate for receiving adjustable pressure applying screws which are operatively engageable with at least one of the grid bars of said cage assembly when said plate is positioned therein for adjustably positioning said grid bars relative to said plate.

6. The retainer plate of claim 4 wherein said longitudinal slot extends substantially the full length of said one plate thereby dividing said one face thereof into two sections, one of said sections being provided with fluid drainage grooves communicating with said slot whereby fluid may flow into said slot through said grooves when said plate is positioned in said cage assembly with said one face section in engagement with a face of said other retainer plate.

7. The press cage assembly of claim 4 wherein drainage grooves are provided in at least one of said contacting faces of said pair of plates, said grooves communicating with said drainage slot in said one plate when said plates are arranged in face to face engagement.

8. In a press cage assembly having an infeed end and a discharge end for expressing fluid from fluid bearing material, a plurality of arcuate grid body sections cooperable to impart a hollow cylindrical configuration to said assembly, a pressure screw member having a screw flight thereon mounted for rotation in said assembly, each of said grid body sections comprising a plurality of discrete grid bars spaced from each other by rigid spacer elements to provide fluid flow passages between adjacent grid bars, and retaining plates securing the grid bars in place, certain predetermined grid bars of each of said grid body sections having dual purpose damming projections extending therefrom toward said screw member, a plurality of such projections being selectively located about the inner periphery of said hollow assembly between said retaining plates, the number of said projections about the inner periphery of the grid body section adjacent the discharge end of said press being greater than the number of said projections about the inner periphery of the grid body section adjacent the infeed end of said press so that said press is progressively restricted toward said discharge end, said projections maintaining pressure in said press by compensating for loss of fluid from said fluid bearing material and precluding rotation of such material with said screw member as the screw member rotates so that said material travels in a substantially straight path through said press as the same is compressed by said screw member.

9. In a press for expressing fluid from fluid bearing material, a cage assembly comprising opposite arcuate body sections defining a hollow substantially cylindrical grid body, and a pressure screw member rotatably mounted in and extending longitudinally through said grid body from an infeed end toward a discharge end thereof, said member having a screw flight thereon cooperable with said body sections for compressing said fluid bearing material to express fluid therefrom; each of said body sections comprising a plurality of discrete narrow elongated grid bars maintained in spaced relationship relative to each other by spacers interposed between adjacent grid bars to provide fluid flow passages therebetween which are substantially free and unrestricted whereby fluid expressed from said fluid bearing material may flow freely from said grid body, and retainer plates at opposite arcuate ends of such body section for maintaining engagement of the respective grid bars and spacers with each other, certain predetermined grid bars having material rotation preventing projections selectively provided thereon extending inwardly of said grid body, said projections being of less length than the length of their associated grid bars, said projections extending toward said screw member and beyond the crest of said screw flight thereon whereby a plurality of such projections are positioned about the inner periphery of said grid body between said retainer plates for contacting material in said press to preclude rotation thereof with said screw member whereby movement of said material is maintained in a substantially straight path through said press and to maintain pressure in said press by compensating for change in volume of said material as fluid is expressed therefrom.

10. The press of claim 9 in which the number of said projections progressively increases toward the discharge end of said press.

11. The press of claim 9 wherein said spacers are balls of two different sizes arranged in inner and outer series relative to the inner periphery of said press grid body, the larger of said balls being positioned in said outer series whereby a flaring configuration is imparted to said fluid flow passages, the balls of said inner series being positioned radially outwardly from said inner periphery whereby said passages are free of restriction adjacent the inner periphery of said grid body.

12. The press of claim 11 wherein opposing faces of adjacent grid bars are provided with depressions defining seats for said inner and outer series of balls.

13. A cage assembly section for a fluid expressing press comprising a plurality of grid bars, ball-like spacers separable from and positioned between adjacent pairs of said bars thereby providing substantially unrestricted fluid flow passages therebetween, and seats in opposing faces of adjacent bars in which said spacers are engaged.

14. A substantially cylindrical cage assembly for a fluid expressing press comprising a plurality of elongated grid bars, spacer means between said grid bars providing substantially radially extending fluid flow passages through said assembly, said spacer means comprising two series of rigid inner and outer ball-like elements engaged in seats provided in opposing faces of adjacent grid bars, the elements of said inner and outer series being of different sizes so that said opposing faces diverge in a direction toward the exterior of said cage assembly whereby a flaring configuration is imparted to said passages, said inner series of elements being spaced from the interior of said assembly whereby said passages are unrestricted adjacent said interior thereby allowing unrestricted free fluid flow through said passages.

15. In combination with rigid ball-like spacer elements, a pair of grid bars positioned in opposing face to face relationship and maintained spaced from each other by said rigid ball-like spacer elements in a fluid expressing press cage assembly, said spacer elements providing a fluid discharge passage between said pair of grid bars, each of the opposing faces of said bars having depressions therein defining seats in which said rigid spacer elements are received between said bars, opposing depressions in said opposing faces being aligned with each other and cooperating with each other to maintain said spacer elements positioned between said bars so that said discharge passage therebetween is maintained open by said elements.

16. In a press for expressing fluid under pressure from a fluid bearing material which press is divided into a pressure section and a feeder section in which material to be compressed is introduced, said feeder section comprising a series of cage bars, spacers between said bars for maintaining said bars separated to provide fluid flow passages therebetween, said bars being arranged to define a substantially annular cage through which a pressure screw is rotatable, each of said bars including a pair of side faces which converge relative to each other toward an end of said bar and a pair of opposite surfaces extending between said side faces which diverge relative to each other toward said bar end, said bars being arranged in said annular cage so that the cage decreases in internal diameter toward an end of said feeder section adjacent said press section whereby material introduced into said feeder section may be compacted and initiation of fluid removal therefrom effected before such material is introduced by said screw member into said press section.

17. A press for expressing fluid from a fluid bearing material comprising a feeder section and a pressure section from the end of which material is discharged, each of said sections being defined by annular series of grid bars peripherally spaced from each other to provide generally radial fluid flow passages therebetween, said grid bars defining a generally cylindrical bore through said press through which said material is movable, a screw shaft rotatable in said bore and having discontinuous screw flights thereon for applying pressure to material in said bore for expressing fluid therefrom, and stationary means for damming the flow of such material through said press to progressively compensate for change in volume of said material as fluid is expressed therefrom, said damming means comprising a series of projections extending into said press bore toward said screw shaft from predetermined ones of said grid bars, said projections being located between adjacent discontinuous flights of said screw shaft, the number of said projections progressively increasing toward the discharge end of said pressure section whereby the bore of said press is progressively blocked toward said discharge end and pressure applied to said material progressively increases toward said discharge end.

18. The press of claim 17 wherein adjustable means are engaged with certain grid bars of the series which define said feeder section and said pressure section for adjustably urging the grid bars of the respective series toward each other.

19. A cage assembly grid body section for a fluid expressing press, comprising a plurality of grid bars, and rigid spacers between adjacent grid bars for maintaining said bars separated to provide fluid flow passages therebetween, said spacers being generally ball shaped and being located in seats provided therefor in opposing side faces of the respective adjacent grid bars, said ball shaped spacers being positioned so that said passages are maintained substantially open and unrestricted adjacent the interior of said body section whereby fluid expressed from fluid bearing material fed to said press may flow freely through said passages from said press body section.

20. A retainer plate for maintaining a plurality of grid bars in proper position in a press cage assembly, comprising a plate body having opposite side faces one of which is positionable adjacent one of said grid bars of said assembly, means whereby said plate may be secured to the cage of said assembly, a series of threaded bores extending through said plate body between said opposite side faces thereof, and a series of set screws threadedly engaged in said series of bores and projectable therefrom to engage said one grid bar when said plate is secured to said cage whereby the grid bars of said assembly may be adjustably urged toward each other by said set screws.

21. In a press cage assembly for expressing fluid from fluid bearing material, said cage assembly having a material infeed end and a discharge end, a plurality of arcuate grid body sections cooperable to impart a hollow cylindrical configuration to said assembly, a pressure screw member having a screw flight thereon mounted for rotation in said assembly, each of said grid body sections comprising a plurality of discrete grid bars spaced from each other by rigid spaced elements to provide fluid flow passages between adjacent grid bars, and retaining plates securing the grid bars in place, certain predetermined grid bars of each of said grid body sections having dual purpose damming projections extending therefrom towards said screw member, a plurality of such projections being located about the inner periphery of said hollow assembly between said retaining plates to maintain pressure in said press by compensating for loss of fluid from said fluid bearing material and to preclude rotation of such material with said screw member as the screw member rotates so that said material travels in a substantially straight path through said press as the same is compressed by said screw member, the number of said dual purpose damming projections positioned about the inner periphery of said cage assembly adjacent said discharge end being greater than the number of said projections positioned about the inner periphery of said cage assembly adjacent said infeed end.

22. In a press cage assembly for expressing fluid from fluid bearing material, said cage assembly having a material infeed end and a discharge end, a plurality of arcuate grid body sections cooperable in impart a hollow cylindrical configuration to said assembly, a pressure screw member having a screw flight thereon mounted for rotation in said assembly, each of said grid body sections comprising a plurality of discrete grid bars spaced from each other by rigid spacer elements to provide fluid flow passages between adjacent grid bars, and retaining plates securing the grid bars in place, certain predetermined grid bars of each of said grid body sections having dual purpose damming projections extending therefrom towards said screw member, a plurality of such projections being located about the inner periphery of said hollow assembly between said retaining plates to maintain pressure in said press by compensating for loss of fluid from said fluid bearing material and to preclude rotation of such material with said screw member as the screw member rotates so that said material travels in a substantially straight path through said press as the same is compressed by said screw member, the number of said dual purpose damming projections positioned about the inner periphery of said cage assembly progressively increasing along said cage assembly from said infeed end to said discharge end.

23. A pair of grid bars to be positioned in spaced opposing face to face relationship in a fluid expressing press cage assembly thereby providing a fluid discharge passage therebetween, each of the opposing faces of said bars having depressions therein defining seats for receiving rigid spacer elements positionable between said bars to maintain said bars separated, said seat defining depressions in both of said opposing faces of said bars being substantially conical in configuration, opposing depressions in said opposing faces being alignable and cooperable for maintaining said spacer elements between said bars whereby said discharge passage may be maintained open.

24. A pair of grid bars to be positioned in spaced opposing face to face relationship in a fluid expressing press cage assembly thereby providing a fluid discharge passage therebetween, each of the opposing faces of said bars having depressions therein defining seats for receiving rigid spacer elements positionable between said bars to maintain said bars separated, said seat defining depressions in one of said opposing faces being in the form of substantially conical recesses and the depressions in the other of said faces being in the form of substantially V-shaped grooves, opposing depressions in said opposing faces being alignable and cooperable for maintaining said spacer elements between said bars whereby said discharge passage may be maintained open.

25. A pair of grid bars to be positioned in spaced opposing face to face relationship in a fluid expressing press cage assembly thereby providing a fluid discharge passage therebetween, each of the opposing faces of said bars having depressions therein defining seats for receiving rigid spacer elements positionable between said bars to maintain said bars separated, said seat defining depressions in both of said opposing spaces being in the form of substantially V-shaped grooves, the grooves in one of said faces extending longitudinally of such face, and the grooves in the other of said faces extending transversely of such face, opposing depressions in said opposing faces being alignable and cooperable for maintaining such spacer elements between said bars whereby said discharge passage may be maintained open.

26. A pair of grid bars to be positioned in spaced opposing face to face relationship in a fluid expressing press cage assembly thereby providing a fluid discharge passage therebetween, each of the opposing faces of said bars having depressions therein defining seats for receiving rigid spacer elements positionable between said bars to maintain said bars separated, said seat defining depressions in each of said opposing faces being in the form of elongated grooves which are of greater length than width and which have substantially arcuate bottoms, the grooves in one of said faces having the length thereof extending longitudinally of such face, and the grooves in the other of said faces having the length thereof extending transversely of such face, opposing depressions in said opposing faces being alignable and cooperable for maintaining said spacer elements between said bars whereby said discharge passage may be maintained open.

27. For use in a tapered portion of the cage assembly of a press for expressing fluid from fluid bearing material, a cage bar having opposite side faces and opposite inner and outer surfaces extending between said side faces, said side faces converging relative to each other toward one end of said bar, said opposite inner and outer surfaces converging relative to each other toward the other end of said bar.

28. For use in a press for expressing fluid from fluid bearing material introduced into such press, a screw shaft positionable to extend through said press from a material infeed end to a material discharge end thereof, said shaft having a substantially uniform root diameter throughout its effective length, said shaft comprising at least three operatively discrete sections, a plurality of interrupted screw flights on said shaft, one of said shaft sections having a screw flight portion thereon which is of predetermined uniform crest diameter and pitch, an adjacent one of said shaft sections having screw flight portions thereon which have progressively decreasing crest diameter and pitch relative to the screw flight portion of said one section, a third of said shaft sections having screw flight portions thereon which are of substantially uniform crest diameter and pitch which are less than the corresponding dimensions of the screw flight portions on said first and second mentioned shaft sections.

29. For use in a press for expressing fluid from fluid bearing material introduced into said press, a screw shaft intended to extend through such press from a material infeed end to a material discharge end, said shaft having a substantially uniform root diameter throughout its length, a plurality of interrupted screw flights on said shaft, a series of adjacent screw flights on part of said shaft having the same crest diameter and pitch, and adjacent screw flights on another part of said shaft having different crest diameters and pitch whereby initial compression of material introduced into said press may be effected by said another part of said screw shaft, said screw shaft being provided with a longitudinal bore extending substantially the length thereof into which a shaft cooling medium is introducible, means for closing off an end of said bore whereby such cooling medium may be retained therein at least temporarily, and means in said bore engageable with the periphery thereof and movable over said periphery when said shaft rotates to preclude build up of deposits on said periphery.

30. The screw shaft of claim 29 wherein said means in said bore comprises at least one elongated rod extending longitudinally of said bore and freely rollable therein.

31. In a press cage assembly for expressing fluid from fluid bearing material, said cage assembly having an infeed end and a discharge end, a plurality of arcuate grid body sections imparting a hollow cylindrical configuration to said assembly, a pressure screw member having a discontinuous screw flight thereon mounted for rotation in said assembly, each of said grid body sections comprising a plurality of discrete bars spaced from each other by rigid spacer elements to provide fluid flow passages between adjacent grid bars, retaining means securing the grid bars in place in said assembly, certain preselected grid bars of each of said body sections being provided with dual purpose damming projections thereon which project inwardly therefrom toward said screw member, said projections being of a length substantially less than the length of their associated grid bars, said said damming projections being positioned selectively about the inner periphery of said cage assembly on preselected ones of said grid bars between said retaining means to maintain pressure in said press by compensating for loss of fluid from said fluid bearing material and to preclude rotation of said material with said screw member as the screw member rotates, the grid body section adjacent said discharge end having more projections located about the inner periphery thereof than the grid body section adjacent said infeed end, said damming projections extending inwardly beyond the crest of said discontinuous screw flight and being located between adjacent portions of said discontinuous screw flight.

32. The press cage assembly of claim 31 in which the number of said damming projections about the periphery of said assembly progressively increases from the infeed end of said assembly toward the discharge end of said assembly, whereby said assembly is progressively blocked by said projections towards its discharge end.

References Cited in the file of this patent

UNITED STATES PATENTS

| | | |
|---|---|---|
| 366,165 | Gray | July 5, 1887 |
| 742,971 | Cummer | Nov. 3, 1903 |
| 829,314 | Anderson | Aug. 21, 1906 |
| 829,315 | Anderson | Aug. 21, 1906 |
| 1,016,272 | Johnson | Feb. 6, 1912 |
| 1,321,351 | Anderson | Nov. 11, 1919 |
| 1,583,033 | Treat et al. | May 4, 1926 |
| 1,640,342 | Anderson | Aug. 30, 1927 |
| 1,722,882 | Anderson | July 30, 1929 |
| 1,867,137 | Carver | July 12, 1932 |
| 1,884,212 | Power | Oct. 25, 1932 |
| 2,084,229 | Van Maanen | June 15, 1937 |
| 2,118,992 | Upton | May 31, 1938 |
| 2,149,736 | Hiller et al. | Mar. 7, 1939 |
| 2,170,547 | Christian | Aug. 22, 1939 |
| 2,216,658 | Anderson | Oct. 1, 1940 |
| 2,223,514 | French | Dec. 20, 1940 |
| 2,325,357 | Anderson | July 27, 1943 |
| 2,483,864 | Zies | Oct. 4, 1949 |
| 2,687,084 | Bowman | Aug. 24, 1954 |
| 2,902,923 | Stacy | Sept. 8, 1959 |

FOREIGN PATENTS

| | | |
|---|---|---|
| 26,864 | Great Britain | Dec. 23, 1905 |
| 80,332 | Germany | Mar. 26, 1895 |
| 613,378 | Germany | May 17, 1935 |